US009028793B2

(12) United States Patent
Xu et al.

(10) Patent No.: US 9,028,793 B2
(45) Date of Patent: May 12, 2015

(54) CATALYST FOR GENERATING HYDROGEN AND METHOD FOR GENERATING HYDROGEN

(75) Inventors: Qiang Xu, Ikeda (JP); Sanjay Kumar Singh, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 814 days.

(21) Appl. No.: 12/956,106

(22) Filed: Nov. 30, 2010

(65) Prior Publication Data

US 2011/0129743 A1    Jun. 2, 2011

(30) Foreign Application Priority Data

Dec. 2, 2009  (JP) ................................ 2009-274513
May 27, 2010 (JP) ................................ 2010-121565

(51) Int. Cl.
*C01B 3/02*   (2006.01)
*C01B 3/04*   (2006.01)
(Continued)

(52) U.S. Cl.
CPC ................. *C01B 3/04* (2013.01); *B01J 23/892* (2013.01); *B01J 35/0013* (2013.01); *B01J 35/006* (2013.01); *B01J 37/16* (2013.01); *C01B 2203/1052* (2013.01); *C01B 2203/1064* (2013.01); *H01M 8/0606* (2013.01); *Y02E 60/364* (2013.01); *Y02E 60/50* (2013.01)

(58) Field of Classification Search
CPC ............................ B01J 23/892; B01J 35/0013
USPC ...................................................... 423/648.1
See application file for complete search history.

(56) References Cited

U.S. PATENT DOCUMENTS

2008/0052994 A1 *  3/2008  Nojima et al. .................. 48/178
2008/0090114 A1 *  4/2008  Schaevitz et al. .............. 429/19
(Continued)

FOREIGN PATENT DOCUMENTS

JP    52-066893 A    6/1977
JP    2001-019401 A  1/2001
(Continued)

OTHER PUBLICATIONS

Chandra, Manish and Xu, Qiang "A high-performance hydrogen generation system: Transition metal-catalyzed dissociation and hydrolysis of ammonia-borane," Journal of Power Sources, Available online Jul. 7, 2005, vol. 156, pp. 190-194.
(Continued)

*Primary Examiner* — Paul Wartalowicz
(74) *Attorney, Agent, or Firm* — Westerman, Hattori, Daniels & Adrian, LLP (57) ABSTRACT

The present invention provides a catalyst for generating hydrogen containing at least one composite metal selected from the group consisting of a composite metal of platinum and nickel and a composite metal of iridium and nickel, the catalyst being used in a decomposition reaction of at least one compound selected from the group consisting of hydrazine and a hydrate thereof; and a method for generating hydrogen, including contacting the catalyst for generating hydrogen with at least one compound selected from the group consisting of hydrazine and a hydrate thereof.
According to the invention, hydrogen can be efficiently generated with improved selectivity in the method for generating hydrogen that utilizes the decomposition reaction of hydrazine.

3 Claims, 6 Drawing Sheets

(51) Int. Cl.
*B01J 23/89* (2006.01)
*B01J 35/00* (2006.01)
*B01J 37/16* (2006.01)
*H01M 8/06* (2006.01)

(56) References Cited

U.S. PATENT DOCUMENTS

2008/0286621 A1* 11/2008 Rosenzweig et al. ............ 429/17
2009/0257928 A1* 10/2009 Jia et al. ........................ 422/187

FOREIGN PATENT DOCUMENTS

| JP | 2002-241102 A | 8/2002 |
| JP | 2003-040602 A | 2/2003 |
| JP | 2004-244251 A | 9/2004 |
| JP | 2006-213563 A | 8/2006 |
| JP | 2007-269514 A | 10/2007 |
| JP | 2007-269529 A | 10/2007 |

OTHER PUBLICATIONS

Xu, Qiang and Chandra, Manish "Catalytic activities of non-noble metals for hydrogen generation from aqueous ammonia-borane at room temperature," Journal of Power Sources, Available online Oct. 27, 2006, vol. 163, pp. 364-370.

Amendola, Stephen C. et al "A safe, portable, hydrogen gas generator using aqueous borohydride solution and Ru catalyst," International Journal of Hydrogen Energy, Oct. 1, 2000, vol. 25 Issue 10, pp. 969-975.

Singh, Sanjay Kumar and Xu, Qiang "Bimetallic nickel-iridium nanocatalysts for hydrogen generation by decomposition of hydrous hydrazine," Chem. Communication, Jul. 2010, vol. 46, pp. 6545-6547.

Singh, Sanjay Kumar and Xu, Qiang "Complete Conversion of Hydrous Hydrazine to Hydrogen at Room Temperature for Chemical Hydrogen Storage," Journal of the American Chemical Society, Sep. 21, 2009, vol. 131, pp. 18032-18033.

Singh, Sanjay K. and Xu, Qiang "Bimetallic Ni-Pt Nanocatalysts for Selective Decomposition of Hydrazine in Aqueous Solution to Hydrogen at Room Temperature for Chemical Hydrogen Storage," Inorganic Chemistry, Apr. 21, 2010, vol. 49, pp. 6148-6152.

Singh, Sanjay Kumar et al "Room-Temperature Hydrogen Generation from Hydrous Hydrazine for Chemical Hydrogen Storage," Journal of the American Chemical Society, May 13, 2009, vol. 131, pp. 9894-9895.

Li, Z.P. et al "Evaluation of alkaline borohydride solutions as the fuel for fuel cell," Journal of Power Sources, Accepted Aug. 20, 2003, vol. 126, pp. 28-33.

* cited by examiner

CATALYST FOR GENERATING HYDROGEN AND METHOD FOR GENERATING HYDROGEN

TECHNICAL FIELD

The present invention relates to catalysts for generating hydrogen and a method for generating hydrogen.

BACKGROUND ART

Various methods for generating hydrogen gas that is supplied to fuel cells are known. Examples of such methods include the electrolysis of water; reactions between metals and acids; the reaction of water with metal hydrides; the reformation of methyl alcohol or natural gas with steam; and the release of hydrogen from hydrogen storage materials, such as hydrogen storage alloys, activated carbon, carbon nanotubes, and lithium-nitrides. However, these methods have drawbacks in that much energy is required to generate hydrogen, the amount of hydrogen generated is small relative to the amount of starting materials used, large-scale equipment is required, etc. For this reason, although these methods are applicable to hydrogen generation on an industrial scale or on a laboratory scale, they are not suitable for use in supplying hydrogen to fuel cells for automobiles, portable fuel cells for, for example, cellular phones and personal computers, and the like, which require a continuous supply of necessary amounts of hydrogen fuel, and for which there is a demand for miniaturization.

Metal hydrides, such as $LiAlH_4$ and $NaBH_4$, are used as hydrogen-generating reagents in laboratories and the like. These compounds need to be handled carefully because they rapidly release a large amount of hydrogen upon contact with water, producing an explosive phenomenon. For this reason, these compounds are also not suitable for use as hydrogen supply sources for fuel cells as mentioned above.

Methods for releasing hydrogen by utilizing hydrolysis reactions of tetrahydroborates, such as $NaBH_4$ (see, e.g., Patent Literatures 1 and 2, and Non-Patent Literatures 1 and 2 listed below), and hydrolysis reactions of ammonia borane represented by the formula $NH_3BH_3$ (see, e.g., Patent Literature 3, and Non-Patent Literatures 3 and 4), have also been reported. However, these methods have problems with recovery and regeneration of the resulting borate compounds.

Hydrazine ($H_2NNH_2$), which is liquid at room temperature and has a high hydrogen content (12.5 wt %), is considered to be promising as a source of hydrogen. Hydrazine is reported to be capable of being decomposed into nitrogen and hydrogen by catalytic reactions. For example, Patent Literature 4 listed below discloses a method for generating hydrogen comprising contacting hydrazine or a derivative thereof with a metal capable of catalyzing the generation of hydrogen, such as nickel, cobalt, iron, copper, palladium, or platinum. However, an investigation of the ability of these metal catalysts to catalyze the generation of hydrogen via decomposition reactions of hydrazine revealed that a sufficient amount of hydrogen is not produced using these catalysts (see Non-Patent Literature 5 below).

Further, Patent Literature 5 discloses a system for producing hydrogen, comprising a decomposer that decomposes ammonia or hydrazine, which is used as a hydrogen source, into nitrogen and hydrogen, and supplies them into fuel cells. However, Patent Literature 5 does not disclose a specific method for generating hydrogen by the decomposition of hydrazine.

Patent Literatures 6 and 7 disclose methods for generating hydrogen by contacting an aqueous hydrazine solution with a catalyst comprising rhodium supported on a support containing alumina or silica. However, according to these methods, hydrogen is not produced from hydrazine at high yield, resulting in an insufficient amount of hydrogen.

CITATION LIST

Patent Literature

PTL 1: Japanese Unexamined Patent Publication No. 2001-19401
PTL 2: Japanese Unexamined Patent Publication No. 2002-241102
PTL 3: Japanese Unexamined Patent Publication No. 2006-213563
PTL 4: Japanese Unexamined Patent Publication No. 2004-244251
PTL 5: Japanese Unexamined Patent Publication No. 2003-40602
PTL 6: Japanese Unexamined Patent Publication No. 2007-269514
PTL 7: Japanese Unexamined Patent Publication No. 2007-269529

Non-Patent Literature

NPTL 1: S. C. Amendola et al., *International Journal of Hydrogen Energy*, 25 (2000), 969-975
NPTL 2: Z. P. Li et al., *Journal of Power Sources*, 126 (2004), 28-33
NPTL 3: M. Chandra, Q. Xu, *Journal of Power Sources*, 156 (2006), 190-194
NPTL 4: Q. Xu, M. Chandra, *Journal of Power Sources*, 163 (2006), 364-370
NPTL 5: Sanjay Kumar Singh, Xin-Bo Zhang, Qiang Xu, *J. Am. Chem. Soc.*, 131 (2009), 9894-9895

SUMMARY OF INVENTION

Technical Problem

The present invention has been made in view of the foregoing problems in the prior art. A principal object of the invention is to provide a method for generating hydrogen that utilizes the decomposition reaction of hydrazine, the method being capable of efficiently generating hydrogen at low cost with improved selectivity.

Solution to Problem

The present inventors have conducted extensive research to achieve the foregoing object. Consequently, the inventors found that, when hydrazine or a hydrate thereof is used as a hydrogen source, the use of a catalyst comprising at least one composite metal selected from the group consisting of a composite metal of platinum and nickel and a composite metal of iridium and nickel enables hydrogen to be generated efficiently at low cost with an extremely high selectivity, as compared to the use of previously known metal catalysts. The present invention has been accomplished based on this finding.

In summary, the invention provides the following catalysts for generating hydrogen and methods for generating hydrogen.

1. A catalyst for generating hydrogen, comprising at least one composite metal selected from the group consisting of a composite metal of platinum and nickel and a composite metal of iridium and nickel, the catalyst being used in a decomposition reaction of at least one compound selected from the group consisting of hydrazine and a hydrate thereof.

2. The catalyst for generating hydrogen according to Item 1, wherein the composite metal of platinum and nickel is an alloy, intermetallic compound, or solid solution of platinum and nickel.

3. The catalyst for generating hydrogen according to Item 1 or 2, wherein the composite metal of platinum and nickel contains 0.1 to 99 mol % of platinum.

4. The catalyst for generating hydrogen according to any one of Items 1 to 3, wherein the composite metal of iridium and nickel is an alloy, intermetallic compound, or solid solution of iridium and nickel.

5. The catalyst for generating hydrogen according to any one of Items 1 to 4, wherein the composite metal of iridium and nickel contains 0.1 to 39 mol % of iridium.

6. A method for generating hydrogen comprising contacting the catalyst for generating hydrogen recited in any one of Items 1 to 5 with at least one compound selected from the group consisting of hydrazine and a hydrate thereof.

7. A method for supplying hydrogen to a fuel cell, comprising supplying hydrogen generated by the method recited in Item 6 as a hydrogen source to a fuel cell.

The present invention will be described in detail below.

In the method for generating hydrogen of the invention, at least one compound selected from the group consisting of hydrazine represented by the formula $H_2NNH_2$ and a hydrate thereof is used as a hydrogen source. Hydrazine anhydride and a monohydrate thereof are known compounds, which are liquid at room temperature. Hydrazine anhydride and a monohydrate thereof are hereinafter sometimes collectively referred to as "hydrazine".

Generally, decomposition of hydrazine using a catalyst is believed to proceed according to the complete decomposition reaction of hydrazine represented by Reaction Equation (1) below, whereby hydrogen and nitrogen are produced, or according to the partial decomposition reaction of hydrazine represented by Reaction Equation (2) below, whereby ammonia and nitrogen are produced:

$$N_2H_4 \rightarrow N_2 + 2H_2 \quad (1)$$

$$3N_2H_4 \rightarrow N_2 + 4NH_3 \quad (2)$$

Non-Patent Literature 5 mentioned above examines the decomposition reaction of hydrazine in the presence of a rhodium catalyst, revealing that, when the reaction is catalyzed by rhodium metal, the partial decomposition reaction of hydrazine represented by Reaction Equation (2) proceeds preferentially relative to the complete decomposition reaction of hydrazine represented by Reaction Equation (1), producing large quantities of ammonia. Non-Patent Literature 5 also states that, when other metal catalysts such as platinum, palladium, nickel, copper, and iron are used, the decomposition reaction of hydrazine does not proceed; whereas when metal catalysts such as cobalt, ruthenium, iridium, and the like are used, the partial decomposition reaction of hydrazine proceeds predominantly, although the complete decomposition reaction of hydrazine also proceeds slightly, producing large quantities of ammonia.

Furthermore, the present inventors' research has shown that, when, for example, a composite metal of platinum and copper or a composite metal of platinum and iron is used as a catalyst, or when a composite metal of iridium and copper, a composite metal of iridium and iron, or a composite metal of iridium and cobalt is used as a catalyst, the selectivity for the hydrogen generation reaction via complete decomposition of hydrazine is not improved.

In contrast, when the at least one composite metal selected from the group consisting of a composite metal of platinum and nickel and a composite metal of iridium and nickel is used as a catalyst, the partial decomposition reaction that produces ammonia is suppressed, and the complete decomposition reaction that produces hydrogen proceeds selectively.

The catalyst comprising the at least one composite metal selected from the group consisting of a composite metal of platinum and nickel and a composite metal of iridium and nickel, and the method for generating hydrogen using the catalyst, will be described in detail below.

Composite Metal Catalyst

The at least one composite metal for use as a catalyst in the method for generating hydrogen of the invention, which is selected from the group consisting of a composite metal of platinum and nickel and a composite metal of iridium and nickel, needs to be a composite metal wherein platinum and nickel are closely correlated or a composite metal wherein iridium and nickel are closely correlated, or a mixture of such composite metals, rather than a simple mixture of platinum and nickel or iridium and nickel. Specific examples of such composite metals include alloys, intermetallic compounds, and solid solutions.

As stated above, the decomposition reaction of hydrazine does not proceed when platinum or nickel metal alone is used as a catalyst. A simple mixture of platinum and nickel metals also does not show activity for the complete decomposition reaction of hydrazine.

When iridium alone is used as a catalyst, the partial decomposition reaction proceeds predominantly, producing large quantities of ammonia. A simple mixture of iridium and nickel metals does not provide an improved selectivity for the complete decomposition reaction of hydrazine, as compared to iridium alone.

Surprisingly, however, when the at least one composite metal selected from the group consisting of a composite metal of platinum and nickel and a composite metal of iridium and nickel is used, the complete decomposition reaction represented by Reaction Equation (1) above proceeds with improved selectivity, enabling hydrogen to be generated with extremely high efficiency.

Among the catalysts used in the present invention, in the composite metal of platinum and nickel, the proportions of platinum and nickel may be such that the proportion of Pt based on the total molar amount of Pt and Ni is about 0.1 to 99 mol %, and preferably about 1 to 99 mol %. When the proportion of Pt is within such a wide range, the composite metal of platinum and nickel shows activity for the complete decomposition reaction of hydrazine. Particularly, when the proportion of Pt is within a range of about 3 to 75 mol %, the selectivity for the hydrogen generation reaction via the complete decomposition reaction of hydrazine can be improved. More particularly, when the proportion of Pt is within a range of about 6 to 40 mol %, the complete decomposition reaction of hydrazine proceeds with an extremely high selectivity, enabling hydrogen to be efficiently generated.

In the composite metal of iridium and nickel, the proportions of iridium and nickel may be such that the proportion of Ir based on the total molar amount of Ir and Ni is about 0.1 to 39 mol %. When the proportion of Ir is within this range, the selectivity for the hydrogen generation reaction via the complete decomposition reaction of hydrazine can be improved as compared to that when Ir is used alone. Particularly, when the proportion of Ir is within a range of about 1 to 25 mol %, the complete decomposition reaction of hydrazine proceeds with an extremely high selectivity, enabling hydrogen to be efficiently generated.

In the invention, the above-described composite metals of platinum and nickel and composite metals of iridium and nickel can be used alone or in a combination of two types or more.

A composite metal of platinum and nickel or a composite metal of iridium and nickel can be produced by any suitable method, including, but not limited to: adding a reducing agent to an aqueous solution containing a platinum compound and a nickel compound to reduce the platinum and nickel ions to metals, thereby producing a desired composite metal of platinum and nickel; or adding a reducing agent to an aqueous solution containing an iridium compound and a nickel compound to reduce the iridium and nickel ions to metals, thereby producing a desired composite metal of iridium and nickel. Other usable methods include adding a reducing agent to an aqueous solution containing a platinum or iridium compound to reduce the platinum or iridium ion, followed by adding a nickel compound thereto to reduce the nickel ion; or adding a reducing agent to an aqueous solution containing a nickel compound to reduce the nickel ion, followed by adding a platinum or iridium compound thereto to reduce the platinum or iridium ion. A highly uniform metal catalyst can be obtained particularly by adding a reducing agent to an aqueous solution containing platinum and nickel compounds to reduce the platinum and nickel ions, or by adding a reducing agent to an aqueous solution containing iridium and nickel compounds to reduce the iridium and nickel ions. The platinum compound, iridium compound, and nickel compound used in these methods are not particularly limited as long as they are soluble in solvents. Examples of usable compounds include chloride, nitrate, sulfate, and like metal salts of platinum, iridium, or nickel, and various metal complexes thereof.

Any suitable reducing agent that can reduce the platinum, iridium, and nickel compounds can be used as a reducing agent for reducing these starting compounds. Examples of such reducing agents include, but are not limited to, sodium tetrahydroborate and hydrazine itself.

Each of the composite metal of platinum and nickel and the composite metal of iridium and nickel may have any suitable size; however, a composite metal composed of ultrafine particles having a particle size of about 1 to 100 nm is advantageously used in view of its high activity. In this case, the particle size of the composite metal is a value measured using an electron microscope.

The at least one composite metal selected from the group consisting of a composite metal of platinum and nickel and a composite metal of iridium and nickel may also be a composite metal further containing other metal(s), as long as the catalytic activity is not adversely affected.

The at least one composite metal selected from the group consisting of a composite metal of platinum and nickel and a composite metal of iridium and nickel may also be used as a catalyst supported on a support containing silica, alumina, zirconia, activated carbon, or the like. Such a supported catalyst can be produced by any suitable method, including, but not limited to, dispersing a support in a solution containing a platinum compound and nickel compound or a solution containing an iridium compound and nickel compound, and reducing the platinum and nickel compounds or the iridium and nickel compounds in the dispersion. The amount of the support is not particularly limited; for example, based on the total amount of the support and the at least one composite metal selected from the group consisting of a composite metal of platinum and nickel and a composite metal of iridium and nickel, the amount of the composite metal is preferably about 0.1 to 20 wt %, more preferably about 0.5 to 10 wt %, and still more preferably about 1 to 5 wt %.

Method for Generating Hydrogen

In the method for generating hydrogen of the invention, at least one compound selected from the group consisting of hydrazine and a hydrate thereof is used as a hydrogen source. The hydrazine and hydrate thereof are not limited to particular types, and commercially available products can typically be used as purchased. In addition to the hydrazine and hydrate thereof, other components may also be included as long as they do not adversely affect the generation of hydrogen.

Among the above-mentioned compounds, when hydrazine anhydride ($H_2NNH_2$) is used as a starting material, hydrogen is generated in an amount of 12.5 wt % relative to hydrazine anhydride, resulting in an increased efficiency of hydrogen generation; however, the ignitability of hydrazine anhydride poses safety problems. On the other hand, when hydrazine monohydrate ($H_2NNH_2.H_2O$) is used as a hydrogen source, hydrogen is generated in an amount of 8.0 wt % relative to the hydrazine monohydrate, still resulting in a high efficiency of hydrogen generation, although the efficiency is slightly lower than that provided by using hydrazine anhydride as a starting material. Moreover, high safety is ensured. Therefore, in consideration of safety, hydrazine monohydrate or an aqueous solution thereof diluted in water may be used. Particularly, in consideration of both safety and hydrogen generation efficiency, an aqueous solution containing the hydrazine at a concentration of about 40 to 60 wt % is preferably used in the invention.

In the method for generating hydrogen of the invention, at least one compound selected from the group consisting of hydrazine and a hydrate thereof, which is used as a hydrogen source, may be contacted with a catalyst comprising the at least one composite metal selected from the group consisting of a composite metal of platinum and nickel and a composite metal of iridium and nickel. The hydrazine (hydrazine anhydride or a hydrate thereof) may be contacted with the catalyst using any suitable method, for example, by adding the hydrazine and catalyst into a reaction vessel and mixing them. Another usable method is introducing an aqueous solution of the hydrazine into a reactor filled with a catalyst, and passing the hydrazine solution through the catalyst bed.

The amount of the catalyst comprising at least one composite metal selected from the group consisting of a composite metal of platinum and nickel and a composite metal of iridium and nickel is not particularly limited. The amount of the at least one composite metal selected from the group consisting of a composite metal of platinum and nickel and a composite metal of iridium and nickel can be selected from a wide range from about 0.0001 to 10 moles per mole of the at least one compound selected from the group consisting of hydrazine and a hydrate thereof.

Particularly, in consideration of the balance between the reaction rate, the catalyst cost, and the like, the amount of the composite metal may preferably be about 0.01 to 0.5 mole per mole of the at least one compound selected from the group consisting of hydrazine and a hydrate thereof. In the case of the method that includes passing the hydrazine or hydrate thereof through a catalyst bed, the amount of the catalyst used in the catalyst bed may be determined in consideration of the flow rate and contact time of the solution of the hydrazine or hydrate thereof.

The reaction temperature of the hydrogen generation reaction is not particularly limited, but is preferably about 0 to 80° C., and more preferably about 10 to 50° C.

The pressure and atmosphere in the reaction system during the reaction can be selected as desired.

Methods of Utilizing Generated Hydrogen

According to the method of the invention, the hydrogen generation reaction by the decomposition of hydrazine proceeds with improved selectivity, enabling hydrogen to be efficiently generated.

The generated hydrogen can, for example, be directly supplied to fuel cells as a fuel. Particularly, because the method for generating hydrogen of the invention can generate hydrogen at around room temperature, and can control the rate of hydrogen generation, the amount of hydrogen generated, and the like, the method of the invention is highly usable for supplying hydrogen to fuel cells for automobiles, portable fuel cells for, for example, cellular phones and personal computers, and the like.

The generated hydrogen can be stored by, for example, collecting it in a vessel filled with a hydrogen storage alloy. The pressure in the generated hydrogen system can also be controlled using a hydrogen storage alloy to adjust the temperature according to the equilibrium pressure-temperature relationship.

Advantageous Effects of Invention

According to the method for generating hydrogen of the invention, hydrogen gas can be efficiently generated under controllable conditions without heating to a high temperature.

Moreover, the catalyst for generating hydrogen of the invention can be produced at low cost because the catalyst exhibits high activity even when it contains a low proportion of platinum or iridium.

Hydrogen gas generated by the method of the invention is highly usable as a fuel for fuel cells for automobiles, portable fuel cells, and the like.

BEST MODE FOR CARRYING OUT THE INVENTION

The present invention will be described in greater detail below, referring to Examples and Comparative Examples.

Example 1

$NiC_2.6H_2O$ (0.058 g), $K_2PtCl_4$ (0.008 g), hexadecyltrimethylammonium bromide (CTAB, 95%) (0.105 g), and water (2.5 mL) were placed in a 30 mL two-necked flask, and the mixture was ultrasonically stirred for 5 minutes. $NaBH_4$ (0.020 g) aqueous solution (1.5 mL) was subsequently added, and the reactor was vigorously shaken for 2 minutes, thereby forming a $Ni_{0.93}Pt_{0.07}$ nanoparticle catalyst.

Figure 1:
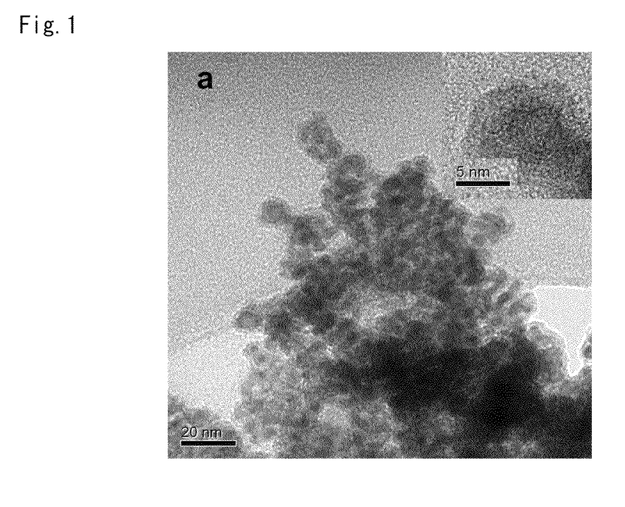
FIG. 1 shows a transmission electron microscope (TEM) image of the catalyst particles obtained in Example 1.

A transmission electron microscope (TEM) image of the $Ni_{0.93}Pt_{0.07}$ nanoparticle catalyst is shown in FIG. 1. As is clear from FIG. 1, the catalyst was composed of ultrafine particles having a particle size of about 5 nm.

Figure 2:
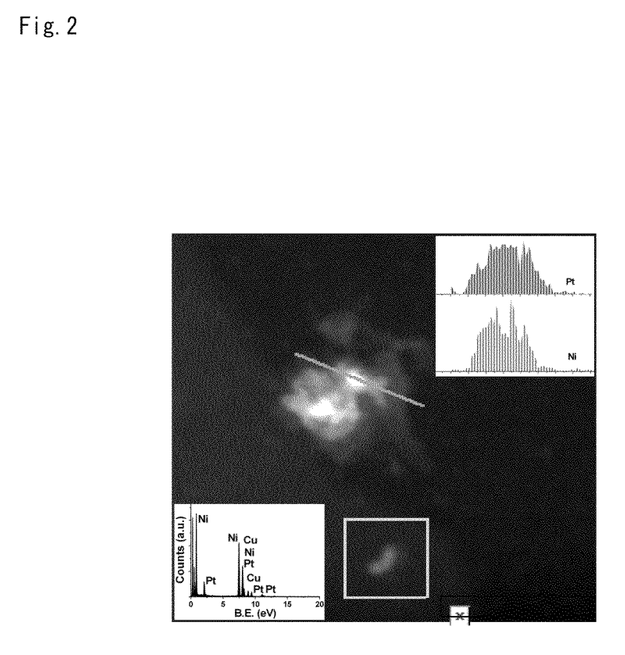
FIG. 2 shows a high-angle annular dark-field (scanning transmission electron microscope) (HAADF-STEM) image and EDS spectra of the catalyst particles obtained in Example 1.

FIG. 2 shows a high-angle annular dark-field (scanning transmission electron microscope) (HAADF-STEM) image of the $Ni_{0.93}Pt_{0.07}$ nanoparticle catalyst; the upper right section shows the EDS spectral intensities of Pt and Ni measured along the line shown in the figure. It can be clearly seen from the EDS spectra shown in FIG. 2 that Pt and Ni are present in the same positions, thereby forming an alloy in which Pt and Ni coexist at the atomic level, rather than being present as separate metal particles.

Next, hydrazine monohydrate ($H_2NNH_2.H_2O$, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 50, 100, 150, and 200 minutes from the beginning of stirring, 5 mL, 9.8 mL, 16.5 mL, 40 mL, 88 mL, 123 mL, and 145 mL, respectively, of released gases were observed.

Figure 3:
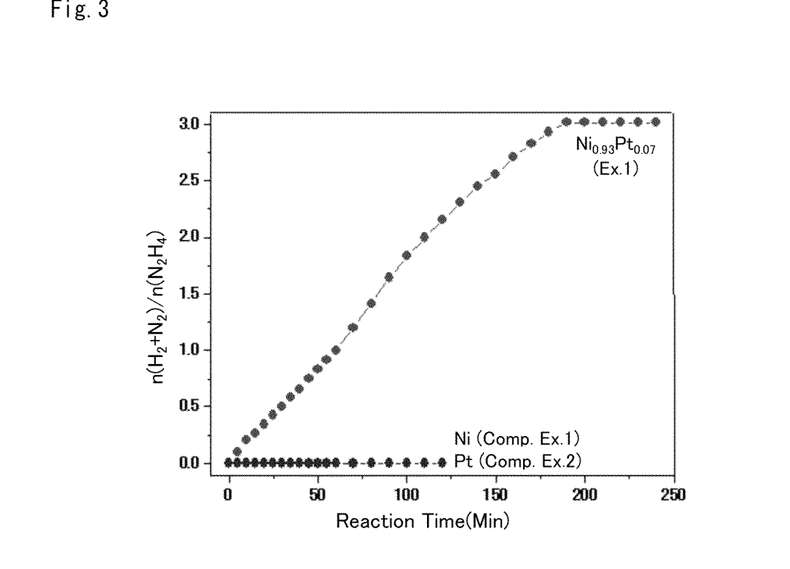
FIG. 3 is a graph showing the relationship between the reaction time and the molar ratio of released gases relative to hydrazine monohydrate, measured in each of Example 1, Comparative Example 1, and Comparative Example 2.
Figure 4:
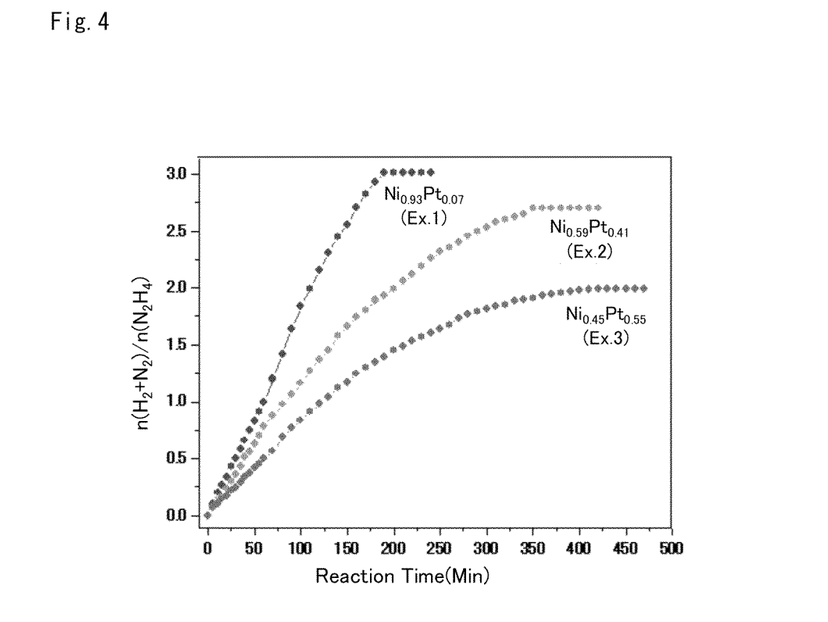
FIG. 4 is a graph showing the relationship between the reaction time and the molar ratio of released gases relative to hydrazine monohydrate, measured in each of Examples 1 to 3.

FIGS. 3 and 4 are graphs each showing the relationship between the reaction time and the molar ratio of the released gases relative to hydrazine monohydrate used as a starting material. The graph of FIG. 3 also shows the results of Comparative Examples 1 and 2 described below, and the graph of FIG. 4 also shows the results of Examples 2 and 3 described below.

Mass spectral (MS) analysis confirmed that the released gases were hydrogen and nitrogen. The amount of the released gases was 3 times the molar amount of the hydrazine used as the starting material. This amount of the released gases is equivalent to 100% selectivity for hydrogen generation.

Furthermore, the gases generated by the above-described method were directly introduced into a solid polymer fuel cell. As a result, normal operation of the fuel cell was confirmed.

Comparative Example 1

$NiCl_2.6H_2O$ (0.072 g), hexadecyltrimethylammonium bromide (CTAB, 95%) (0.105 g), and water (2.5 mL) were placed in a 30 mL two-necked flask, and the mixture was ultrasonically stirred for 5 minutes. $NaBH_4$ (0.020 g) aqueous solution (1.5 mL) was subsequently added, and the reactor was vigorously shaken for 2 minutes, thereby forming a Ni nanoparticle catalyst.

Hydrazine monohydrate ($H_2NNH_2.H_2O$, 99%) (0.1 mL, 1.97 mmol) was added into the two-necked flask via a syringe, and stirring was performed for 120 minutes at room temperature. However, gas release was not observed.

Comparative Example 2

$K_2PtCl_4$ (0.083 g), hexadecyltrimethylammonium bromide (CTAB, 95%) (0.105 g), and water (2.5 mL) were placed in a 30 mL two-necked flask, and the mixture was ultrasonically stirred for minutes. $NaBH_4$ (0.020 g) aqueous solution (1.5 mL) was subsequently added, and the reactor was vigorously shaken for 2 minutes, thereby forming a Pt nanoparticle catalyst.

Hydrazine monohydrate ($H_2NNH_2.H_2O$, 99%) (0.1 mL, 1.97 mmol) was added into the two-necked flask via a syringe, and stirring was performed for 120 minutes at room temperature. However, gas release was not observed.

Example 2

$NiCl_2.6H_2O$ (0.022 g), $K_2PtCl_4$ (0.027 g), hexadecyltrimethylammonium bromide (CTAB, 95%) (0.105 g), and water (2.5 mL) were placed in a 30 mL two-necked flask, and the mixture was ultrasonically stirred for 5 minutes. $NaBH_4$ (0.020 g) aqueous solution (1.5 mL) was subsequently added, and the reactor was vigorously shaken for 2 minutes, thereby forming a $Ni_{0.59}Pt_{0.41}$ nanoparticle catalyst having a particle size of about 5 nm.

Hydrazine monohydrate ($H_2NNH_2.H_2O$, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 50, 100, 150, 200, 250, 300, and 350 minutes from the beginning of stirring, 3 mL, 5.5 mL, 11.5 mL, 30.5 mL, 56 mL, 80 mL, 96 mL, 111.5 mL, 122 mL, and 130 mL, respectively, of released gases were observed.

Mass spectral (MS) analysis confirmed that the released gases were hydrogen and nitrogen. The amount of the released gases was 2.7 times the molar amount of the hydrazine used as the starting material. This amount of the released gases is equivalent to 89% selectivity for hydrogen generation.

Furthermore, the gases generated by the above-described method were directly introduced into a solid polymer fuel cell. As a result, normal operation of the fuel cell was confirmed.

Example 3

$NiCl_2.6H_2O$ (0.014 g), $K_2PtCl_4$ (0.030 g), hexadecyltrimethylammonium bromide (CTAB, 95%) (0.105 g), and water (2.5 mL) were placed in a 30 mL two-necked flask, and the mixture was ultrasonically stirred for 5 minutes. $NaBH_4$ (0.020 g) aqueous solution (1.5 mL) was subsequently added, and the reactor was vigorously shaken for 2 minutes, thereby forming a $Ni_{0.45}Pt_{0.55}$ nanoparticle catalyst having a particle size of about 5 nm.

Hydrazine monohydrate ($H_2NNH_2.H_2O$, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 50, 100, 200, 300, 400, and 450 minutes from the beginning of stirring, 3.8 mL, 5 mL, 8.5 mL, 20 mL, 40 mL, 70 mL, 87 mL, 95 mL, and 96 mL, respectively, of released gases were observed.

Mass spectral (MS) analysis confirmed that the released gases were hydrogen and nitrogen. The amount of the released gases was 2.0 times the molar amount of the hydrazine used as the starting material. This amount of the released gases is equivalent to 62% selectivity for hydrogen generation.

Furthermore, the gases generated by the above-described method were directly introduced into a solid polymer fuel cell. As a result, normal operation of the fuel cell was confirmed.

Example 4

$NiCl_2.6H_2O$ (0.045 g), $H_2IrCl_6$ (0.004 g), hexadecyltrimethylammonium bromide (CTAB, 95%) (0.100 g), and water (2.5 mL) were placed in a 30 mL two-necked flask, and the mixture was ultrasonically stirred for 5 minutes. The mixture was then heated for 5 minutes at 50° C., and returned to room temperature. $NaBH_4$ (0.020 g) aqueous solution (1.5 mL) was subsequently added, and the reactor was vigorously shaken for 5 minutes, thereby forming a $Ni_{0.95}Ir_{0.05}$ nanoparticle catalyst.

Figure 5:
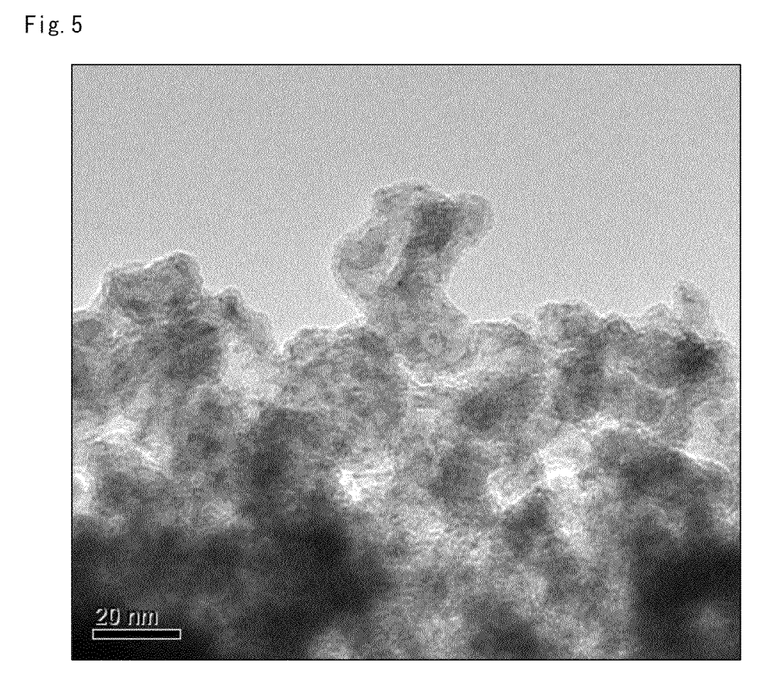
FIG. 5 shows a transmission electron microscope (TEM) image of the catalyst particles obtained in Example 4.

A transmission electron microscope (TEM) image of the $Ni_{0.95}Ir_{0.05}$ nanoparticle catalyst is shown in FIG. 5. As is clear from FIG. 5, the catalyst was composed of ultrafine particles having a particle size of about 5 nm.

Figure 6:
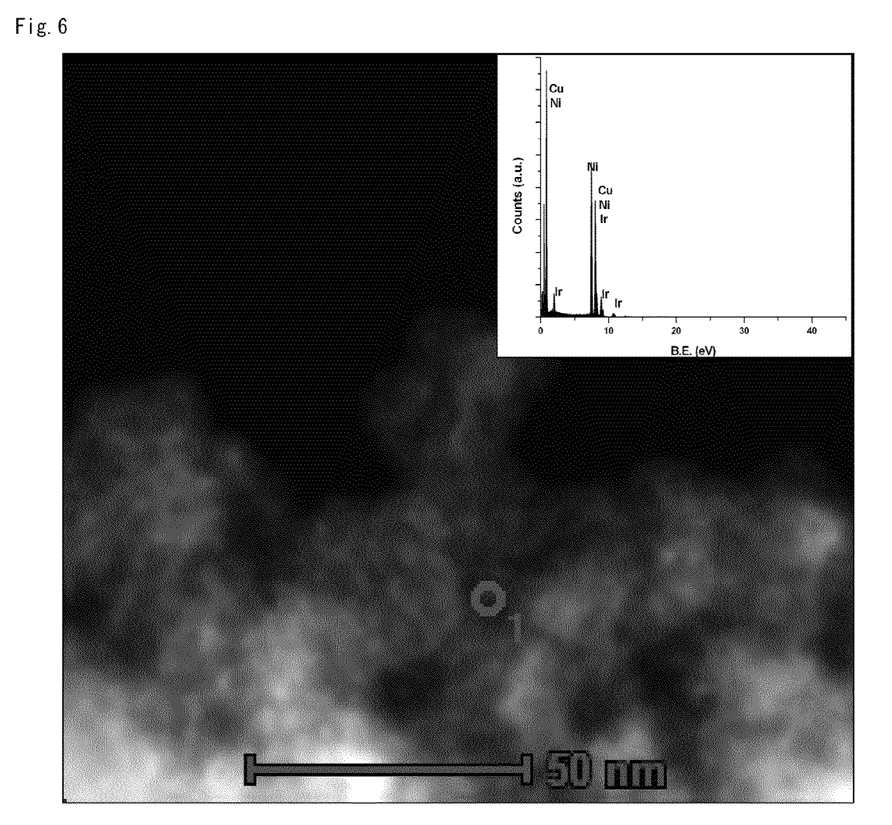
FIG. 6 shows a high-angle annular dark-field (scanning transmission electron microscope) (HAADF-STEM) image and EDS spectra of the catalyst particles obtained in Example 4.

FIG. 6 shows a high-angle annular dark-field (scanning transmission electron microscope) (HAADF-STEM) image of the $Ni_{0.95}Ir_{0.05}$ nanoparticle catalyst; the upper right section shows the EDS spectral intensities of Ir and Ni measured at the position indicated by the dot in the figure. The EDS spectra shown in FIG. 6 clearly show that Ir and Ni are present in the same positions, thereby forming an alloy in which Ir and Ni coexist at the atomic level, rather than being present as separate metal particles.

Next, hydrazine monohydrate ($H_2NNH_2.H_2O$, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 50, 100, 150, 300, 405, 450, and 540 minutes from the beginning of stirring, 2 mL, 4.3 mL, 8.5 mL, 22 mL, 42 mL, 60 mL, 105 mL, 130 mL, 144 mL, and 146 mL, respectively, of released gases were observed.

Figure 7:
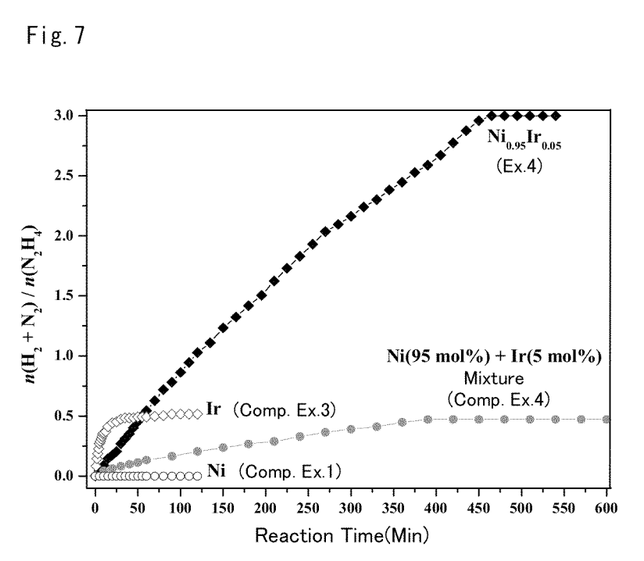
FIG. 7 is a graph showing the relationship between the reaction time and the molar ratio of released gases relative to hydrazine monohydrate, measured in each of Example 4, Comparative Example 1, Comparative Example 3, and Comparative Example 4.

FIG. 7 is a graph showing the relationship between the reaction time and the molar ratio of the released gases relative to hydrazine monohydrate used as a starting material. The graph of FIG. 7 also shows the results of Comparative Example 1, and the results of Comparative Examples 3 and 4 described below.

Mass spectral (MS) analysis confirmed that the released gases were hydrogen and nitrogen. The amount of the released gases was 3 times the molar amount of the hydrazine used as the starting material. This amount of released gases is equivalent to 100% selectivity for the hydrogen generation reaction via the complete decomposition of hydrazine.

Furthermore, the gases generated by the above-described method were directly introduced into a solid polymer fuel cell. As a result, normal operation of the fuel cell was confirmed.

Comparative Example 3

IrCl$_3$ (0.058 g), hexadecyltrimethylammonium bromide (CTAB, 95%) (0.105 g), and water (2.5 mL) were placed in a 30 mL two-necked flask, and the mixture was ultrasonically stirred for 5 minutes. NaBH$_4$ (0.020 g) aqueous solution (1.5 mL) was subsequently added, and the reactor was vigorously shaken for 2 minutes, thereby forming an Ir nanoparticle catalyst.

Hydrazine monohydrate (H$_2$NNH$_2$.H$_2$O, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 1, 2, 4, 6, 10, 20, 30, 40, 50, and 60 minutes from the beginning of stirring, 4 mL, 7 mL, 11 mL, 14 mL, 17.5 mL, 21.5 mL, 23 mL, 23.5 mL, 24 mL, and 24 mL, respectively, of released gases were observed.

Mass spectral (MS) analysis confirmed that the released gases were hydrogen and nitrogen. The amount of the released gases was 0.5 times the molar amount of the hydrazine used as the starting material. This amount of released gases is equivalent to 7% selectivity for the hydrogen generation reaction via the complete decomposition of hydrazine.

Comparative Example 4

Ni nanoparticles and Ir nanoparticles were separately formed according to the same methods as described in Comparative Example 1 and Comparative Example 3, respectively, and these nanoparticles were dried. 11.2 mg of the thus-obtained Ni nanoparticles and 2 mg of the thus-obtained Ir nanoparticles were placed in a 30 mL two-necked flask, and these nanoparticles were dispersed in water (4 mL) by stirring.

Hydrazine monohydrate (H$_2$NNH$_2$.H$_2$O, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 10, 30, 60, 120, 180, 240, 330, 360, 390, and 480 minutes from the beginning of stirring, 2 mL, 4 mL, 6.5 mL, 10 mL, 13 mL, 16 mL, 20 mL, 22 mL, 23 mL, and 23 mL, respectively, of released gases were observed.

Mass spectral (MS) analysis confirmed that the released gases were hydrogen and nitrogen. The amount of the released gases was 0.5 times the molar amount of the hydrazine used as the starting material. This amount of released gases is equivalent to 7% selectivity for the hydrogen generation reaction via the complete decomposition of hydrazine.

As is clear from these results, when a mixture of the Ni nanoparticles and Ir nanoparticles was used as a catalyst, the selectivity for the hydrogen generation reaction was the same as that obtained in Comparative Example 3 using the catalyst consisting of Ir nanoparticles, and no improvement in selectivity for the hydrogen generation reaction via the complete decomposition of hydrazine was observed.

Example 5

NiCl$_2$.6H$_2$O (0.043 g), H$_2$IrCl$_6$ (0.008 g), hexadecyltrimethylammonium bromide (CTAB, 95%) (0.100 g), and water (2.5 mL) were placed in a 30 mL two-necked flask, and the mixture was ultrasonically stirred for 5 minutes. The mixture was then heated for 5 minutes at 50° C., and returned to room temperature. NaBH$_4$ (0.020 g) aqueous solution (1.5 mL) was subsequently added, and the reactor was vigorously shaken for 5 minutes, thereby forming a Ni$_{0.90}$Ir$_{0.10}$ nanoparticle catalyst.

Next, hydrazine monohydrate (H$_2$NNH$_2$.H$_2$O, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 40, 60, 80, 120, 180, 210, 240, 270, and 300 minutes from the beginning of stirring, 3 mL, 7 mL, 13 mL, 29.5 mL, 45 mL, 62 mL, 90 mL, 119 mL, 130 mL, 139 mL, 145 mL, and 146 mL, respectively, of released gases were observed.

Figure 8:
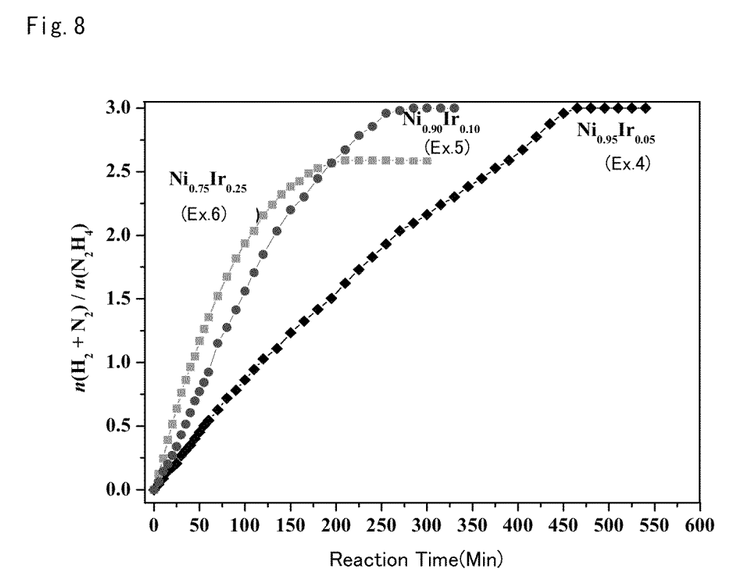
FIG. 8 is a graph showing the relationship between the reaction time and the molar ratio of released gases relative to hydrazine monohydrate, measured in each of Examples 4 to 6.

FIG. 8 is a graph showing the relationship between the reaction time and the molar ratio of the released gases relative to hydrazine monohydrate used as a starting material. The graph of FIG. 8 also shows the results of Example 4, and the results of Example 6 described below.

Mass spectral (MS) analysis confirmed that the released gases were hydrogen and nitrogen. The amount of the released gases was 3.0 times the molar amount of the hydrazine used as the starting material. This amount of released gases is equivalent to 100% selectivity for the hydrogen generation reaction via the complete decomposition of hydrazine.

Furthermore, the gases generated by the above-described method were directly introduced into a solid polymer fuel cell. As a result, normal operation of the fuel cell was confirmed.

Example 6

NiCl$_2$.6H$_2$O (0.036 g), H$_2$IrCl$_6$ (0.020 g), hexadecyltrimethylammonium bromide (CTAB, 95%) (0.100 g), and water (2.5 mL) were placed in a 30 mL two-necked flask, and the mixture was ultrasonically stirred for 5 minutes. The mixture was then heated for 5 minutes at 50° C., and returned to room temperature. NaBH$_4$ (0.020 g) aqueous solution (1.5 mL) was subsequently added, and the reactor was vigorously shaken for 5 minutes, thereby forming a Ni$_{0.75}$Ir$_{0.25}$ nanoparticle catalyst.

Next, hydrazine monohydrate (H$_2$NNH$_2$.H$_2$O, 99%) (0.1 mL, 1.97 mmol) was added into the two-necked flask via a syringe, and stirring was continued at room temperature. Released gases were passed through a trap containing 1.0 M hydrochloric acid, where ammonia was absorbed; subsequently, only hydrogen and nitrogen were introduced into a gas burette, and the amount of the released gases was measured. After 5, 10, 20, 40, 60, 80, 100, 120, 150, 180, 210, and 270 minutes from the beginning of stirring, 6 mL, 12 mL, 25 mL, 47 mL, 66 mL, 81.5 mL, 94 mL, 105 mL, 116 mL, 123 mL, 126 mL, and 126 mL, respectively, of released gases were observed.

Mass spectral (MS) analysis confirmed that the released gases were hydrogen and nitrogen. The amount of the released gases was 2.6 times the molar amount of the hydrazine used as the starting material. This amount of released gases is equivalent to 85% selectivity for the hydrogen generation reaction via the complete decomposition of hydrazine.

Furthermore, the gases generated by the above-described method were directly introduced into a solid polymer fuel cell. As a result, normal operation of the fuel cell was confirmed.

Example 7

The method of Example 4 for producing nickel-iridium nanoparticles was repeated, except that the amounts of $NiCl_2 \cdot 6H_2O$ and $H_2IrCl_6$ were varied, thereby preparing a $Ni_{0.99}Ir_{0.01}$ nanoparticle catalyst, a $Ni_{0.60}Ir_{0.40}$ nanoparticle catalyst, a $Ni_{0.50}Ir_{0.50}$ nanoparticle catalyst, and a $Ni_{0.25}Ir_{0.75}$ nanoparticle catalyst. Using each of these catalysts, experiments for measuring released gases using hydrazine monohydrate as a starting material were performed according to the same method as in Example 4, and the selectivity for the hydrogen generation reaction via the complete decomposition reaction of hydrazine was determined from the amounts of released hydrogen and nitrogen.

Figure 9:
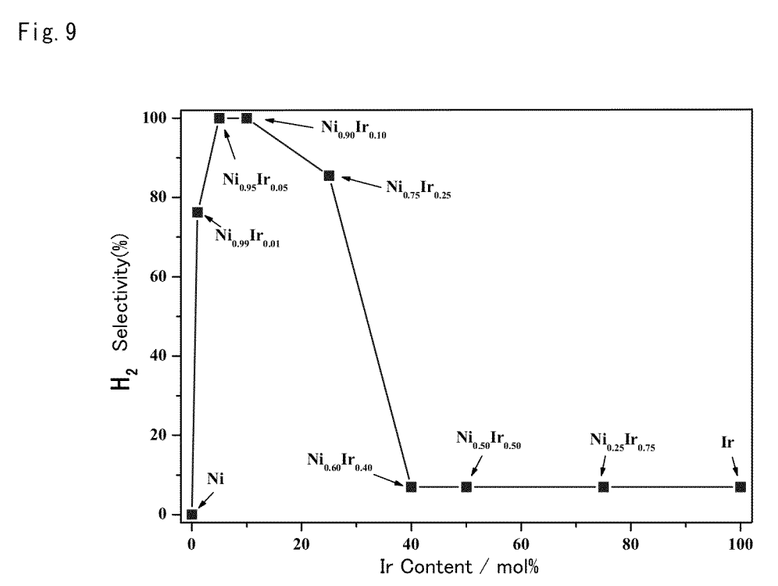
FIG. 9 is a graph showing the relationship between the Ir content (mol %) in the nickel-iridium nanoparticle catalyst and the selectivity for the hydrogen generation reaction.

FIG. 9 is a graph showing the relationship between the Ir content (mol %) in the nickel-iridium nanoparticle catalyst and the selectivity for the hydrogen generation reaction, which was determined based on the results of Example 7 and the results of Examples 4 to 6 and Comparative Examples 1 and 3.

It can be seen from FIG. 9 that, when the proportion of Ir based on the total molar amount of Ir and Ni is within a range of 0.1 to 39 mol %, the selectivity for the hydrogen generation reaction via the complete decomposition reaction of hydrazine is improved.

The invention claimed is:

1. A method for generating hydrogen comprising contacting a catalyst for generating hydrogen with at least one compound selected from the group consisting of hydrazine and a hydrate thereof, wherein the catalyst is an alloy represented by $Ni_{(1-x)}Ir_x$, x=0.01 to 0.25, prepared by adding a reducing agent to an aqueous solution containing an iridium compound, a nickel compound and hexadecyltrimethylammonium bromide to reduce the iridium and nickel ions, and a reaction temperature of the hydrogen generation reaction is 0 to 80° C.

2. A method for supplying hydrogen to a fuel cell, comprising supplying hydrogen generated by the method recited in claim 1 as a hydrogen source to a fuel cell.

3. The method according to claim 1, wherein a selectivity of the complete decomposition reaction is more than 85% in the hydrogen generation reaction.

\* \* \* \* \*